US008410922B2

(12) United States Patent
Null et al.

(10) Patent No.: US 8,410,922 B2

(45) Date of Patent: Apr. 2, 2013

(54) MOTION SENSOR WITH ULTRASONIC MODULATION

(75) Inventors: Jon Null, San Jose, CA (US); Jason Joyce, Vista, CA (US); Thomas L. Grey, San Marcos, CA (US)

(73) Assignee: The Watt Stopper Inc., Santa Clara, CA (US)

( * ) Notice: Subject to any disclaimer, the term of this patent is extended or adjusted under 35 U.S.C. 154(b) by 322 days.

(21) Appl. No.: 12/927,753

(22) Filed: Nov. 23, 2010

(65) Prior Publication Data

US 2012/0130511 A1 May 24, 2012

(51) Int. Cl.

| | |
|---|---|
| ***G08B 23/00*** | (2006.01) |
| ***G08B 13/18*** | (2006.01) |
| ***G08B 21/00*** | (2006.01) |
| ***G08C 19/16*** | (2006.01) |
| ***G08C 19/04*** | (2006.01) |
| ***G01M 1/38*** | (2006.01) |
| ***G05B 13/00*** | (2006.01) |
| ***G05B 15/00*** | (2006.01) |
| ***G05D 23/00*** | (2006.01) |
| ***G06F 19/00*** | (2006.01) |
| ***G01B 5/28*** | (2006.01) |
| ***G01B 5/30*** | (2006.01) |

(52) U.S. Cl. ..... 340/523; 340/529; 340/552; 340/573.1; 340/870.11; 340/870.16; 700/275; 702/39; 702/40

(58) Field of Classification Search .................... 700/79, 700/275; 702/33, 35, 39, 40; 340/500, 506, 340/517, 520–523, 527–529, 540, 541, 552, 340/554–557, 573.1, 870.01, 870.11, 870.16

See application file for complete search history.

(56) References Cited

U.S. PATENT DOCUMENTS

| | | | | |
|---|---|---|---|---|
| 4,857,912 | A * | 8/1989 | Everett et al. | 340/508 |
| 5,093,656 | A * | 3/1992 | Dipoala | 340/522 |
| 5,196,826 | A * | 3/1993 | Whiting | 340/554 |
| 5,796,353 | A * | 8/1998 | Whitehead | 340/870.01 |
| 6,191,688 | B1 * | 2/2001 | Sprouse | 340/506 |
| 6,415,205 | B1 * | 7/2002 | Myron et al. | 700/275 |
| 6,791,458 | B2 * | 9/2004 | Baldwin | 340/522 |
| 7,760,088 | B2 * | 7/2010 | Tsuji | 340/552 |
| RE41,674 | E * | 9/2010 | Sasaki et al. | 318/282 |
| 7,982,606 | B2 * | 7/2011 | Wu et al. | 340/554 |
| 8,092,251 | B2 * | 1/2012 | Rosenblatt | 439/536 |
| 8,102,261 | B2 * | 1/2012 | Wu | 340/554 |

FOREIGN PATENT DOCUMENTS

| | | | |
|---|---|---|---|
| EP | 2146222 | A2 * | 1/2010 |
| GB | 2279791 | A * | 1/1995 |

* cited by examiner

*Primary Examiner* — Crystal J Barnes-Bullock

(74) *Attorney, Agent, or Firm* — Jag Patent Services

(57) ABSTRACT

A dual-technology motion sensor with an ultrasonic sensor element (transducer) and a PIR sensor element is disclosed. The dual-technology motion sensor is configured to modulate ultrasonic radiation emitted from the ultrasonic sensor element when the motion sensor detects a condition under which other wireless devices, especially ultrasound-based wireless devices, are in operation, thereby eliminating problems associated with interference.

23 Claims, 2 Drawing Sheets

MOTION SENSOR WITH ULTRASONIC MODULATION

FIELD OF THE INVENTION

This invention relates to motion sensors. More particularly, this invention relates to controlling ultrasonic sensor elements in dual-technology motion sensors.

BACKGROUND OF THE INVENTION

The principal components of dual-technology motion sensors comprise an ultrasonic and a passive infrared sensor. Ultrasonic sensors (also known as transceivers, when they both send and receive) work on a principle similar to radar or sonar which evaluates attributes of a target by interpreting the echoes from radio or sound waves. Ultrasonic sensors typically use a transducer, which generates sound waves in the ultrasonic range, above 20,000 hertz (20 kilohertz or 20 KHz), by turning electrical energy into sound, then upon receiving the echo turn the sound waves into electrical energy, which can be evaluated for evidence of motion in an area being monitored for control purposes. Changes in the phase, frequency (Doppler shift) or amplitude may be evaluated in the reflected echo. As the companion-sensor in a dual-technology motion sensor, a passive infrared (PIR) sensor is an electronic device that measures infrared (IR) light radiating from objects in its field of view. Apparent motion is detected when an infrared source with one temperature, such as a human, passes in front of an infrared source with another temperature, such as a wall. Infrared radiation enters through the front of the PIR sensor, its sensor face. At the core of a PIR sensor is a solid-state sensor or set of sensors, made from an approximately ¼ inch-square of natural or artificial pyroelectric materials. In a PIR-based motion detector, the PIR sensor is typically mounted on a printed circuit board containing the necessary electronics required to interpret the signals from the pyroelectric sensor chip. Infrared energy is able to reach the pyroelectric sensor typically through a window formed of material that is transparent to infrared radiation. The window may include focusing elements, such as a Fresnel lens or a mirror segment that may each be provided separately from the window. A person entering a room is detected when the infrared energy emitted from that person's body is focused by a Fresnel lens or a mirror segment and overlaps a section on the chip that had previously been looking at some much cooler part of the room. That portion of the chip is now much warmer than when the person wasn't there. As the person moves across the room, so does the hot spot on the chip's surface. This moving hot spot is evaluated by the electronics connected to the chip to perform a control function.

Containing both these types of internal sensors, a variety of motion sensors on the market today detect the presence of people in a room for the purpose of controlling a load such as automatically turning on/off lights or turning on/off electronic devices in a room. One such sensor-system uses an ultrasonic transmitter and receiver and a PIR sensor, such as the one disclosed in U.S. Pat. No. 5,189,393. Some dual technology or multiple technology sensors may use instead of or in addition to the PIR sensor other sensing technologies such as microwave, acoustic, vibration, imaging, electromagnetic, magnetic, and the like. One disadvantage of current ultrasonic systems is that ultrasonic sensors can interfere with other wireless devices.

SUMMARY OF THE INVENTION

The present invention is directed to a motion sensor which controls an ultrasonic sensor element under conditions when the ultrasonic sensor can interfere with other wireless devices or visa-versa.

Preferably, the motion sensor of the present invention is a dual-technology motion sensor with an ultrasonic sensor element (transducer), a PIR sensor element, a control circuit, a microprocessor and a user interface. The motion sensor, for example, controls lighting and/or one or more load circuits in response to detected motion and is further configured to modulate ultrasonic radiation emitted from the ultrasonic sensor element when the motion sensor detects a condition under which other wireless devices, especially ultrasound-based wireless devices, are potentially in operation, thereby eliminating problems associated with interference. For example, a number of electronic white boards use ultrasonic radiation to determine what is being written on the white board and send this information to a computer or other display device. Also, some hearing aids have been known to experience interference problems when operating in close proximity of motion sensors with ultrasound-based detection components.

In operation, the ultrasonic sensor element detects a first level of motion, and the PIR sensor element detects a second level of motion. The motion sensor controls one or more load circuits when the first level of motion and the second level of motion are above a first threshold value, which may be tuned to each sensor element separately. In addition, a dual technology motion sensor may be configured in different operational modes, such as requiring both sensors to sense motion or requiring only one of the sensors to sense motion.

In accordance with an embodiment of the present invention, the motion sensor turns off, disables or modulates (e.g., pulses) the ultrasonic sensor element via a control circuit when the motion detected by at least one of the ultrasonic sensor element and the PIR sensor element is above a second threshold value, which is preferably greater than the first threshold value. The second threshold value preferably indicates an increase in activity in the vicinity of the motion sensor, such as when a person is writing on an electronic white board. In accordance with further embodiments of the present invention the first threshold value and the second threshold value are selectable by a user through the user interface. The user interface is a manual user interface with buttons, keys or switches and/or is a wireless user interface that receives input values from a wireless input device, such as a remote control. Preferably, a time delay that the lights stay on or the one or more load circuits remain closed for the period of the time delay when the first level of motion and/or the second level of motion fall below the first threshold value is also adjustable through the user interface, such as described above.

In an alternative embodiment of the invention, the motion sensor turns off or disables the ultrasonic sensor element when the motion sensor detects a second ultrasonic radiation being emitted from a source other than from the ultrasonic sensor element of the motion sensor. The motion sensor either detects the second ultrasonic radiation through the ultrasonic sensor element of the motion sensor or through a second ultrasonic sensor element. The second ultrasonic sensor element is either built into the motion sensor or is separate from the motion sensor. In either case, the control circuit preferably monitors for changes in an amplitude of ultrasonic radiation within the vicinity of the motion sensor and turns off, disables or modulates the ultrasonic sensor element when the changes in the amplitude are above a threshold value or when a different ultrasonic frequency is detected.

A system in accordance with the embodiments of the invention includes a motion sensor for controlling a load in response to detected motion, such as described above, and an ultrasonic-based communication device or ultrasound sensitive device. For example the ultrasonic-based communication device is an electronic white board or any other device with an ultrasonic transmitter and/or receiver, and the ultrasound sensitive device is a hearing aid or any other device whose normal operation may be disrupted by the ultrasound. The system includes means for detecting the ultrasonic radiation emitted from the communication device, which as described above is the motion sensor itself or a second ultrasonic sensor element or for detecting when an ultrasound sensitive device will be used in the coverage area such as via the user interface. The system is configured to turn off, disable or modulate ultrasonic radiation emitted from the ultrasonic sensor element of the motion sensor in response to the detected ultrasonic radiation emitted from the communication device or the detected ultrasound sensitive device.

DETAILED DESCRIPTION OF THE INVENTION

Figure 1:
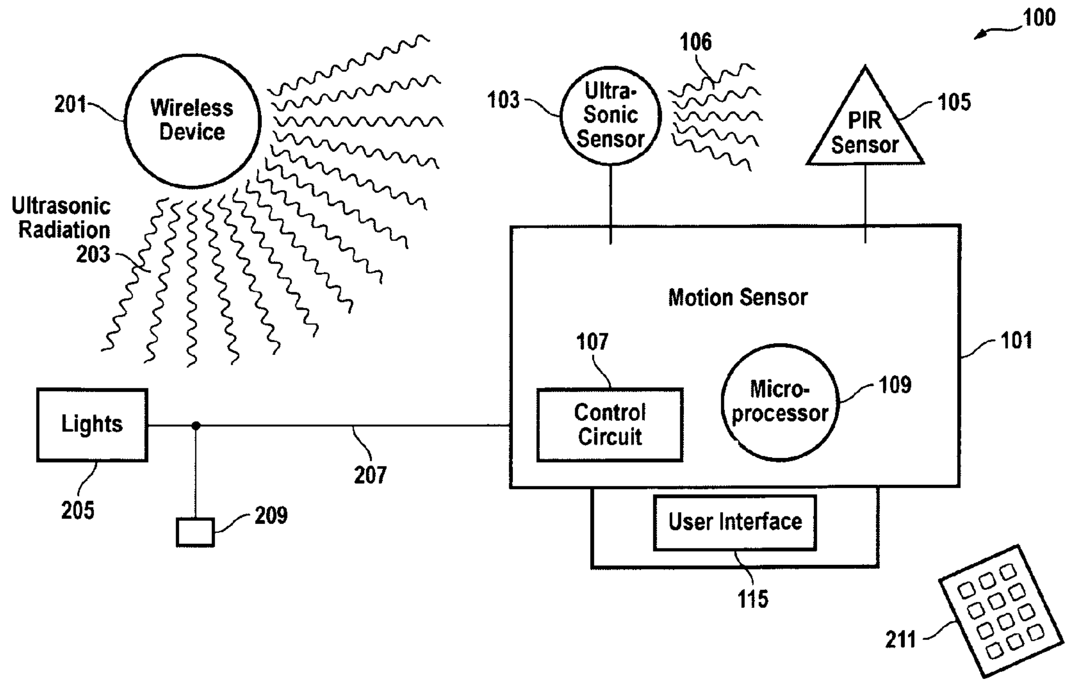
FIG. 1 shows a schematic representation of a motion sensor, in accordance with the embodiments of the invention.

Referring to FIG. 1, motion sensor 100 includes a housing 101 that can have any suitable dimensions. The motion sensor 100 preferably includes an ultrasonic sensor element 103 (transducer) and a PIR sensor element 105. In operation the ultrasonic sensor element 103 detects a first level of motion and the PIR sensor 105 detects a second level of motion. When the first level of motion and the second level of motion are above a first threshold value, the motion sensor 100 is configured to close one or more load circuits 207 coupled to a power source 209 and thereby control power to lights 205.

Preferably, the motion sensor 100 includes a user interface 115. The user interface 115 is a manual user interface having buttons, keys, switches or other user control (not shown) and/or is a wireless user interface that receives input values from a wireless input device 211, such as a remote control. The user interface may include feedback to the user, e.g., visual, auditory, or kinesthetic as are known in the art. Through the user interface 115, a user can select or program the first threshold value corresponding to the sensitivity of the motion sensor 100 and/or a time delay that a load circuit 207 remains closed (the load remains energized) when the first level of motion and the second level of motion fall below the first threshold value. Alternatively, the first level of motion may have a corresponding first threshold value unique to its signal characteristics and the second level of motion may have a corresponding first threshold value unique to its signal characteristics, each settable through the user interface 115. For example, motion signal changes in ultrasonic signals tend to be of relatively short duration whereas motion signal changes in PIR signals tend to be of relatively long duration, so a first level of motion corresponding to an ultrasonic signal may use a short time length threshold whereas a second level of motion corresponding to a PIR signal may use a longer time length threshold. This allows for either or both sensor elements to be different from their respective threshold (e.g., above or below as described above) to control one or more load circuits 207.

The motion sensor 100 also includes a microprocessor 109 programmed with all the appropriate firmware or software to perform all functions described herein. The motion sensor 100 further includes control circuit 107 for executing control commands from the user interface 115 and processing motion detection signals received from the ultrasonic sensor element 103 and the PIR sensor element 105. The motion sensor 100 is programmed further to modulate ultrasonic radiation 106 emitted from the ultrasonic sensor element 103, when the motion sensor detects a condition under which a second ultrasonic device, such as wireless device 201, is in operation and emitting ultrasonic radiation 203, thereby reducing or eliminating interference between the motion sensor 100 and the wireless device 201. Modulation may include simply turning off or temporarily disabling ultrasonic radiation 106 or transferring it from a continuous output mode to a pulsed output mode at the same frequency, transferring from one ultrasonic frequency to a different ultrasonic frequency, amplitude modulating the ultrasonic energy, frequency modulating the ultrasonic energy, or any other technique that results in a change in the ultrasonic radiation that reduces the interference with the second source of ultrasonic energy.

Still referring to FIG. 1, the microprocessor 109 of the motion sensor 100 is programmed to turn off, disable or waveform modulate the ultrasonic sensor element 103 through the control circuit 107 when the motion detected by at least one of the ultrasonic sensor element 103 and the PIR sensor element 105 is above a second threshold value, which is preferably greater than the first threshold value. In accordance with the embodiments of the invention, the second threshold value, which typically indicates an increased motion detection or activity, such as when a person is actively lecturing using a white board, is also selectable by a user through the user interface 115 either directly or by using the remote control device 211, such as described previously. The PIR sensor element (or any other secondary sensor element in the motion sensor that is not the ultrasonic sensor element) is then available to continue to monitor the area for signs of motion or occupancy and the load remains controlled. The secondary sensor may have an additional time delay such that when the secondary sensor signal falls below its second threshold value, the time delay timer starts and when it times out, the ultrasound sensor is re-enabled or reset to its typical operation to regain the benefit of the dual technology motion sensor. Alternatively, the ultrasonic sensor element may be disabled until the PIR or secondary sensor signal falls below its first threshold, which causes the load shut off time delay timer to start its timing function, and when the shut off timer reaches a settable time threshold that is less than the entire shut off time, the ultrasonic sensor is re-enabled to be able to pick up fine motion and interrupt the shut down timer so that the load remains energized.

Figure 2:
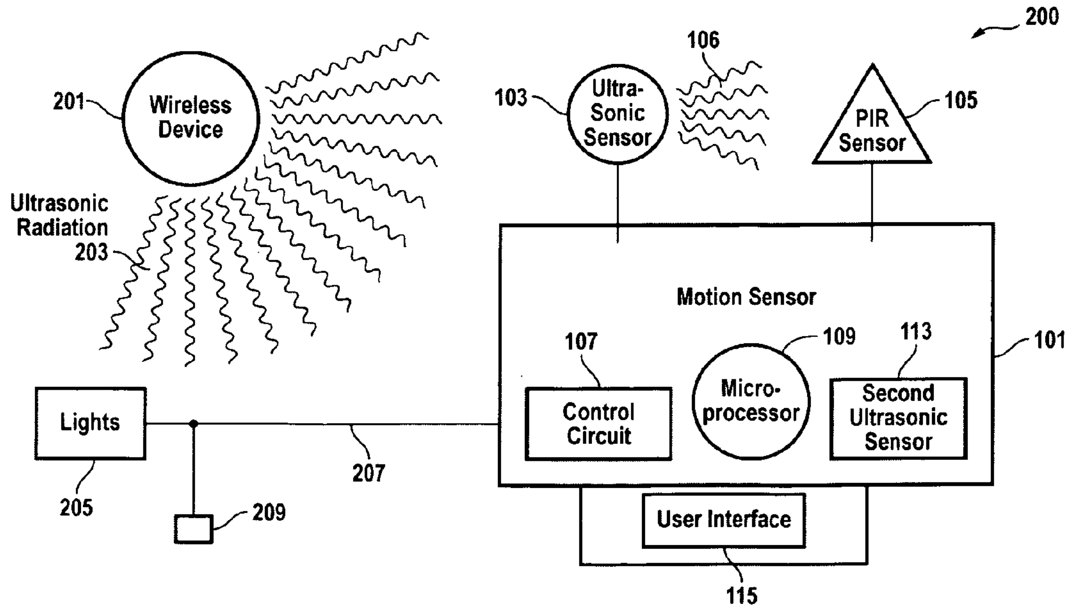
FIG. 2 shows a motion sensor with a second ultrasonic sensor, in accordance with the embodiments of the invention.

Now to FIG. 2, alternatively to modulating the ultrasonic sensor element 103 in response a detected increase in motion or activity, the motion sensor 200 of the present invention is configured to monitor changes in ultrasonic radiation. For simplicity of the description, similar elements have been assigned the same element number. As described previously, with respect to the motion sensor 100 (FIG. 1) the motion sensor 200 includes a housing 101, an ultrasonic sensor element 103 and a PIR sensor element 105. The motion sensor 200 is configured to close one or more load circuits 207 coupled to a power source 209 in response to detected motion and open the one or more load circuits 207 after a period of time (a time delay) when detected motion falls below a threshold value and thereby control lights 205.

Preferably, the motion sensor 200 also includes a user interface 115 to select the threshold value and the time delay, such as described previously. The microprocessor 109 is programmed with all the appropriate firmware or software to perform all functions described herein and is coupled to a control circuit 107 for executing control commands from the user interface 115 and processing motion signals received from the ultrasonic sensor element 103 and the PIR sensor element 105.

In accordance with this embodiment, the motion sensor 200 is programmed to modulate ultrasonic radiation 106 emitted from the ultrasonic sensor element 103 when the motion sensor 200 detects a second ultrasonic radiation 203 that is emitted from a wireless device 201. In operation, the motion sensor 102 detects the second ultrasonic radiation 203 through the ultrasonic sensor element 103 or through a second ultrasonic sensor element 113. In either case, the control circuit 107 monitors for changes in amplitude of ultrasonic radiation that is emitted in the vicinity of the motion sensor 200 and turns off, disables or pulses ultrasonic radiation 106 emitted from the ultrasonic sensor element 103 when the changes in the amplitude are above an amplitude threshold value. The amplitude threshold value is predetermined or is selectable through the user interface 115. Alternatively, other characteristics of the received ultrasonic signal may be monitored via hardware or software for indication of two sources, for example, by evaluating the signal for a so-called beat frequency, constructive/destructive interference, or standing wave phenomena as are known in the art, such as by evaluating amplitude or frequency characteristics. Alternatively, the signal may be evaluated for frequency content indicative of two very different ultrasonic frequencies, such as 20 KHz and 40 KHz, e.g., via hardware or software bandpass filtering for typical ultrasonic frequencies. Doppler methods may also be used to differentiate two slightly different frequency sources if the frequency difference is greater than the expected change in a single source's frequency due to motion-related Doppler shift; Doppler methods may be combined with amplitude envelope modulation evaluation and suitable thresholds to differentiate motion differences from interference differences. A phase locked loop may be used to ascertain a change in phase between the emitted and received frequency that exceeds a selectable threshold indicative of a second ultrasonic radiation source. Currently, ultrasonic sensor elements are tuned to a resonant frequency of a specific value, typically 20 KHz, 40 KHz and 80 KHz, so a mix of these sensors may be provided, either as single devices or in an array within one device, and improved materials that can detect a broad band of ultrasonic frequencies as a single device is anticipated.

Figure 3:
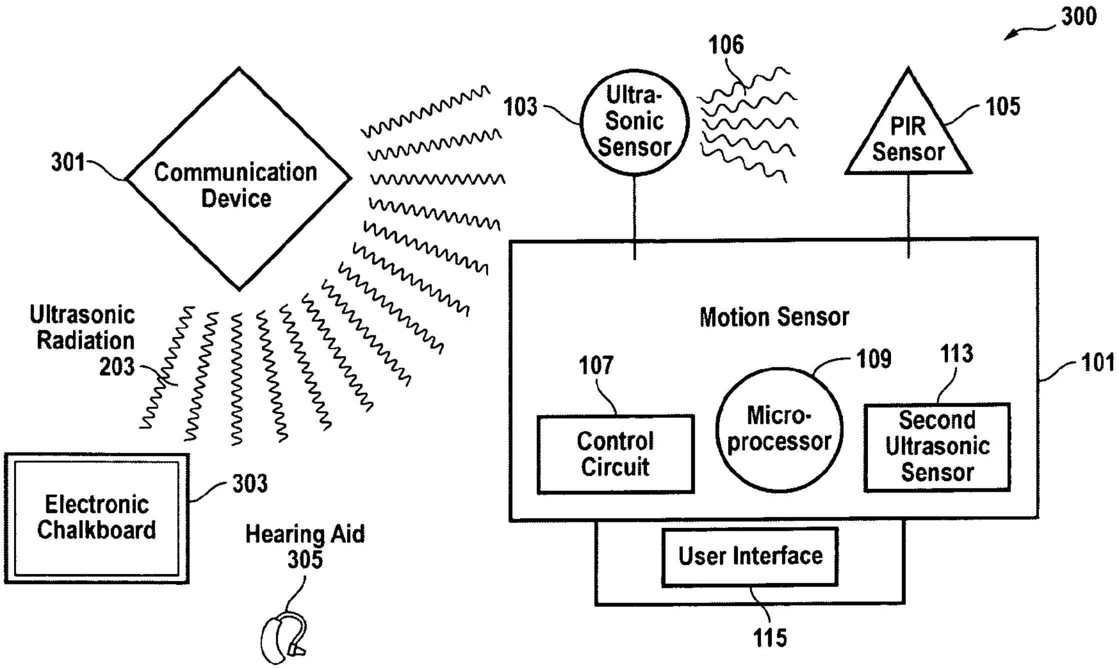
FIG. 3 shows a system with a motion sensor and an ultrasonic-based communication device, in accordance with a preferred embodiment of the invention.

Referring now to FIG. 3, a system in accordance with the embodiments of the invention includes a motion sensor 300 and a communication device 301 that emits or is sensitive to ultrasonic radiation 203. For example, the communication device 301 is an electronic white board 303, a hearing aid 305, or any communication device that emits, detects or is affected by ultrasonic radiation, whereby the performance of the communication device 301 is potentially compromised by ultrasonic radiation 106 that is emitted from the ultrasonic sensor element 103 or visa versa.

The motion sensor 300, like the motion sensor 100 and 200 (FIGS. 1 and 2) includes a housing 101, an ultrasonic sensor element 103 and a PIR sensor element 105. The motion sensor 101 is configured to close one or more load circuits (not shown) in response to detected motion and open the one or more load circuits (not shown) after a period of time when detected motion is below a threshold value after a time delay and, thereby control lights (not shown). The motion sensor 300 also includes a user interface 115 to select threshold values, the time delay and a microprocessor 109 is programmed with all the appropriate firmware or software to perform all functions described herein. The motion sensor 300 further includes a control circuit 107 for executing control commands from the user interface 115 and processing motion detection signals received from the ultrasonic sensor element 103 and the PIR sensor element 105.

The motion sensor is configured to modulate ultrasonic radiation 106 emitted from the ultrasonic sensor element 103 when the motion sensor 300 detects an increase in motion or activity, such as described with respect to the motion sensor 100 (FIG. 1) or when the motion sensor 300 detects an increase in local ultrasonic radiation 203 indicating that the communication device 301 is on or when motion sensor 300 detects when an ultrasound sensitive device is being used in the coverage area such as detecting a corresponding signal from a user interface. As described previously, the motion sensor 300 detects the increase in local ultrasonic radiation either through the ultrasonic sensor element 103 or through a second ultrasonic sensor element 113 (or multiple resonant sensors for appropriate frequencies), such as described in detail with respect to the motion sensor 200 (FIG. 2), or through analysis of the received ultrasonic signal for particular wave phenomena, Doppler techniques, etc., as described above. The ultrasonic radiation may be turned off or disabled by disabling the electronic waveform used to drive the sensor element, e.g., by having the microprocessor stop driving the sensor if it does so directly, or by having the microprocessor disable an external sensor driving circuit, such as a free-running oscillator, by interrupting power to the oscillator through a transistor.

In another embodiment (not shown), the motion sensor may be set up with at least two different ultrasonic transceivers that allow switching from one frequency of use to another frequency of use. For example, if it is determined that the second source of ultrasonic energy is operating at 40 KHz, then the sensor could switch to operation at a different, less interfering frequency, such as 20 KHz or 80 KHz. Alternatively, a third sensing technology, such as acoustic monitoring or microwave motion detection, could be provided and switched to after disabling the ultrasonic sensor element to maintain a dual technology motion sensor functionality.

Figure 4:
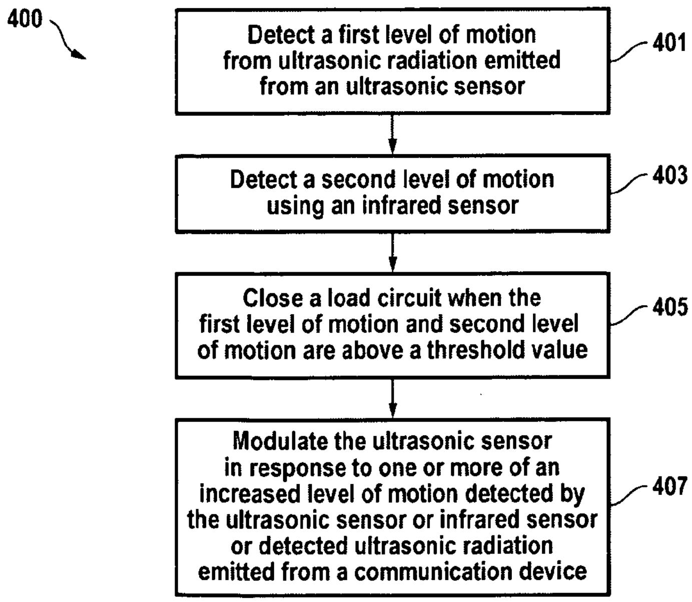
FIG. 4 shows a block-flow diagram outlining steps for modulating ultrasonic sensor element of a motion sensor, in accordance with the method of the invention.

FIG. 4 shows a block-flow diagram 400 outlining steps, in accordance with the preferred method of the invention. In the step 401*a* first level of motion is detected using ultrasonic radiation emitted from an ultrasonic sensor. After the first level of motion is detected or concurrently with detecting the first level of motion in the step 401, in the step 403 a second level of motion is detected using PIR sensor. When the first level of motion and the second level of motion are above a threshold value, in the step 405 one or more load circuits are closed, to preferably control lights by applying power or control signals to the lights. While the lights are on in the step 405, in the step 407 one or more potential conditions under which one or more wireless devices operate are monitored and ultrasonic radiation emitted from the ultrasonic sensor is modulated in response to the detection of the one or more potential conditions. As described in detail above, the one or more potential conditions include an increase in motion or activity or detection of a second source of local ultrasonic radiation within the vicinity of the motion detector or determining via a user interface that an ultrasound sensitive device is in use in the coverage area.

For the situation in which an ultrasound sensitive device is in an area covered by a motion sensor having an ultrasonic sensing component, such as a person using a sensitive hearing aid in a office, a different adaptation strategy may be used since the sensitive device is not emitting ultrasound or does not in and of itself affect the sensor's ultrasonic signal enough to be independently discovered. In order to detect this condition, the motion sensor must allow a manual intervention, such as a direct user interface (e.g., push buttons, set switches or voice command), a remote control, or a network interface, that allows a user to invoke one of the modulation schemes noted above, such as disabling, modulating or changing the motion sensor's ultrasound output to reduce the interference. For example, an office may be equipped with a remote control for adjusting the ultrasound output of a motion sensor installed into the office. A person using the office may notice interference with their hearing aid and use the remote to disable, turn down, modulate or change fundamental frequencies of the ultrasound transmitter in the motion sensor. Alternatively, a building maintenance person may set operational modes on the motion sensor, for example, via a DIP switch, to effect a permanent adaptation for the person using the office on a regular basis. Alternatively, if the motion sensor is part of a networked system, the user may be able to make changes to the sensor directly from his computer or the building maintenance person may be able to make changes from a central controlling computer.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention. For example, although the invention utilizes both an ultrasonic and a PIR sensor element, the same inventive steps regarding monitoring of the received ultrasonic signal and modulating the sensor's ultrasonic output may be used in a motion sensor comprised only of an ultrasonic sensor element. In that instance, the sensor may use a delay timer to periodically re-enable itself to detect motion to maintain a load in an energized state and disable itself again if it determines that an interference situation exists.

What is claimed is:

1. A motion sensor comprising:

a) a motion sensor unit for controlling a load in response to detected motion, the motion sensor unit comprising:

I) an ultrasonic sensor for detecting a first level of motion;

ii) a PIR sensor for detecting a second level of motion, wherein the motion sensor unit is configured to close a load circuit when the first level of motion and the second level of motion are above a first threshold value; and b) means for turning off the ultrasonic sensor when the motion detected by at least one of the ultrasonic sensor and the PIR sensor is above a second threshold value.

2. The motion sensor of claim 1, wherein the means for turning off the ultrasonic sensor comprises a control circuit with a microprocessor.

3. The motion sensor of claim 2, further comprising a user interface for selecting the first threshold value and the second threshold value.

4. The motion sensor of claim 1, further comprising means for adjusting a time-delay that the load circuit remains open when the first level of motion and the second level of motion are below a first threshold value.

5. A motion sensor comprising:

a) a motion sensor unit for controlling a load in response to detected motion, the motion sensor unit comprising:

I) an ultrasonic sensor for detecting a first level of motion;

ii) a PIR sensor for detecting a second level of motion, wherein the motion sensor unit is configured to close a load circuit when the first level of motion and the second level of motion are above a threshold value; and b) means for turning off the ultrasonic sensor when ultrasonic radiation emitted from a source other than the ultrasonic sensor is detected.

6. The motion sensor of claim 5, wherein the means for turning off the ultrasonic sensor comprises a transducer that detects the ultrasonic radiation emitted from the source.

7. The motion sensor of claim 5, wherein the means for turning off the ultrasonic sensor comprises a control circuit that determines changes in an amplitude of the ultrasonic radiation emitted from a source and turns off the ultrasonic sensor when the changes in the amplitude are above a threshold value.

8. The motion sensor of claim 7, wherein the ultrasonic sensor detects the ultrasonic radiation emitted from the source.

9. The motion sensor of claim 5, further comprising a user interface selecting the threshold value.

10. The motion sensor of claim 5, further comprising means for adjusting a time-delay that the load circuit remains open when the first level of motion and the second level of motion are below the threshold value.

11. A system comprising:

a) a motion sensor unit for controlling a load in response to detected motion, the motion sensor unit comprising:

I) an ultrasonic sensor for detecting a first level of motion from ultrasonic radiation emitted from the ultrasonic sensor;

ii) a PIR sensor for detecting a second level of motion, wherein the motion sensor unit is configured to close a load circuit when the first level of motion and the second level of motion are above a threshold value;

b) a communication device, wherein the communication device emits ultrasonic radiation;

c) means for detecting the ultrasonic radiation emitted from the communication device; and d) means for modifying the ultrasonic radiation emitted from the ultrasonic sensor in response to the detected ultrasonic radiation emitted from the communication device.

12. The system of claim 11, wherein the communication device is a white board.

13. The system of claim 11, wherein the means for detecting the ultrasonic radiation emitted from the communication device comprises an ultrasonic transducer built into motion sensor unit.

14. The system of claim 11, wherein means for modifying the ultrasonic radiation emitted from the ultrasonic sensor comprises a control circuit that disables the ultrasonic radiation emitted from the ultrasonic sensor.

15. The system of claim 11, wherein means for modifying the ultrasonic radiation emitted from the ultrasonic sensor comprises a control circuit that modulates the ultrasonic radiation from the ultrasonic sensor.

16. The system of claim 11, wherein means for modifying the ultrasonic radiation emitted from the ultrasonic sensor comprises a control circuit that changes the ultrasonic radiation from the ultrasonic sensor from an interfering frequency to a non-interfering frequency.

17. The system of claim 11, further comprising a user interface for selecting the threshold value.

18. The system of claim 11, further comprising means for adjusting a time-delay that the load circuit remains open when the first level of motion and the second level of motion are below the threshold value.

19. A method comprising:

a) detecting a first level of motion from ultrasonic radiation emitted from an ultrasonic sensor element;

b) detecting a second level of motion using a PIR sensor element;

c) closing a load circuit when the first level of motion and the second level of motion are above a first threshold value;

d) detecting one or more conditions that indicate an ultrasonic communication device is in operation in the vicinity of a motion sensor with the an ultrasonic sensor element; and e) modulating ultrasonic radiation emitted from the ultrasonic sensor in response to the one or more detected conditions.

20. The method of claim 19, wherein detecting one or more conditions comprises measuring amplitude characteristics of the local ultrasonic radiation.

21. The method of claim 19, wherein detecting one or more conditions comprises measuring frequency characteristics of the local ultrasonic radiation.

22. The method of claim 19, wherein detecting one or more conditions comprises measuring differences in phase between the transmitted and received ultrasonic signals.

23. The method of claim 19, further detecting one or more conditions comprises measuring a motion or activity at a second threshold value that is greater than the first threshold value.

* * * * *